United States Patent [19]
Bonmann et al.

[11] Patent Number: 5,720,173
[45] Date of Patent: Feb. 24, 1998

[54] GAS-COOLED BUSHING IN CRYOTANKS FOR SUPERCONDUCTING APPLICATIONS

[75] Inventors: Dietrich Bonmann, Meckenheim, Germany; Sven Hörnfeldt, Västerås, Sweden

[73] Assignee: Asea Brown Boveri AB, Västerås, Sweden

[21] Appl. No.: 428,206

[22] PCT Filed: Nov. 1, 1993

[86] PCT No.: PCT/SE93/00908

§ 371 Date: May 17, 1995

§ 102(e) Date: May 17, 1995

[87] PCT Pub. No.: WO94/13048

PCT Pub. Date: Jun. 9, 1994

[30] Foreign Application Priority Data

Nov. 30, 1992 [SE] Sweden ................ 9203591

[51] Int. Cl.⁶ ................................ F25B 19/00
[52] U.S. Cl. ............... 62/51.1; 62/259.2; 174/125.1; 335/216
[58] Field of Search .............. 62/51.1, 259.2; 335/216; 174/125.1

[56] References Cited

U.S. PATENT DOCUMENTS

| | | | |
|---|---|---|---|
| 4,340,405 | 7/1982 | Steyert, Jr. et al. | 62/51.1 |
| 4,739,633 | 4/1988 | Faris | 62/51.1 |
| 4,813,244 | 3/1989 | Brzozowski | 62/51.1 |
| 5,065,582 | 11/1991 | Seifert | 62/51.1 |
| 5,166,776 | 11/1992 | Dederer et al. | 62/51.1 |
| 5,299,425 | 4/1994 | Hingst | 62/51.1 |
| 5,317,879 | 6/1994 | Goldberg et al. | 62/51.1 |

Primary Examiner—Ronald C. Capossela
Attorney, Agent, or Firm—Watson Cole Stevens Davis, P.L.L.C.

[57] ABSTRACT

A cooling device for cooling of current leads (6, 7) in the bushings of a cryotank (1), wherein the current leads in the gas-filled part of the cryotank are designed as plate-formed sub-leads (12) surrounded by a casing (8) of insulating material with an inner open part of rectangular shape. Between all the sub-leads inside the cryotank there are arranged a number of rows of inclined transverse ribs (13a, 13b, ... 13n, 14a, 14b ... 14n) of insulating material. On the inner walls of the casing, facing the plate edges of the sub-leads, and at the ends of the transverse ribs, shelves (15, 16) are fixed whereby spiral cooling coils are formed around the current leads from the lower edge of the casing.

3 Claims, 2 Drawing Sheets

FIG. 1
FIG. 2
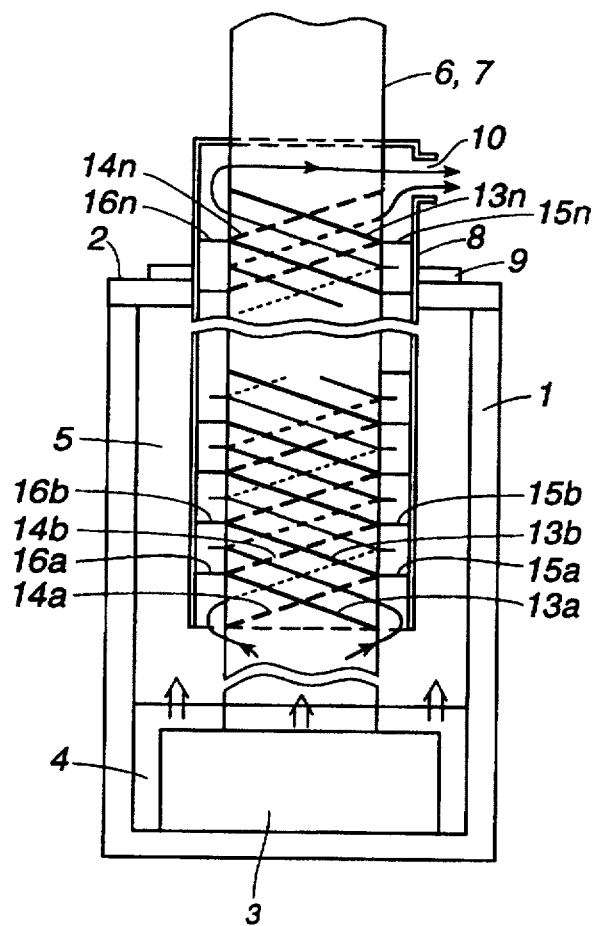
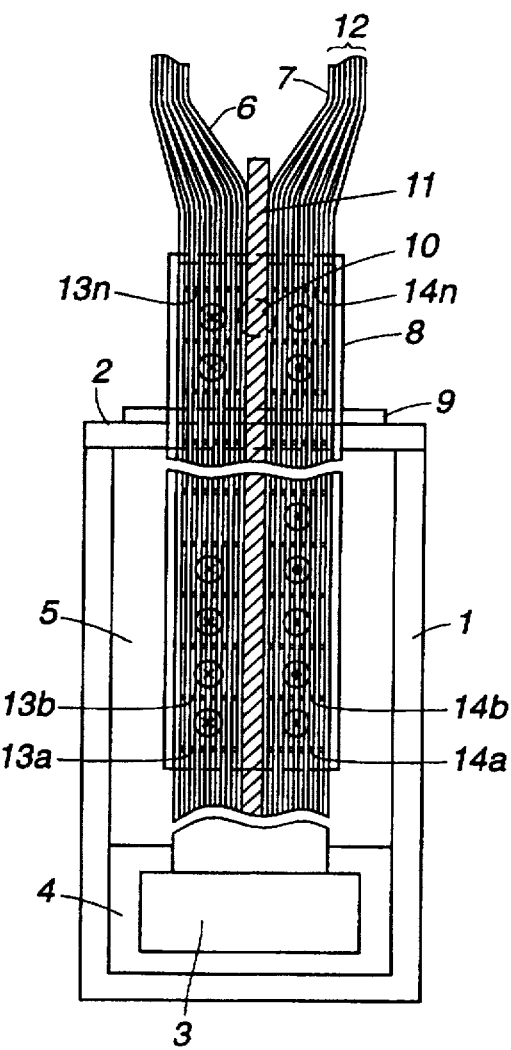

GAS-COOLED BUSHING IN CRYOTANKS FOR SUPERCONDUCTING APPLICATIONS

TECHNICAL FIELD

In the application of the superconducting effect, the object which is to be cooled to such a temperature that the electrical conductors associated with the object become superconducting is normally disposed in a so-called cryotank. In the lower part of the cryotank the refrigerant is arranged in the form of a cryogenic liquid surrounding the object. The space is the cryotank above the liquid level is occupied by the refrigerant in gaseous state. The electric current connection to the object is brought about by current leads in bushings which via fixing flanges are attached to the lid of the cryotank. Inside the cryotank the bushings are open at the bottom, whereby the refrigerant in gaseous state surrounds the current leads and cools these. The invention relates to a special design of the bushings and the current leads to attain an optimum cooling effect of the current leads.

BACKGROUND ART, THE PROBLEMS

The walls and bottom of a cryotank are very well thermally insulated against the surroundings with the aid of outer layers with radiation shields where air has been evacuated, that is, where a vacuum is created. Thus, there is no mentionable influx of heat to the interior of the cryotank from the surroundings. However, as will be clear from the following, the temperature of the gas at the inside of the lid attain a temperature which practically corresponds to the temperature of the surroundings. The temperature of the gas at the boundary layer between gas and liquid obtains the boiling-point temperature of the liquid at the pressure considered. The temperature difference which prevails between the lower and upper parts of the gas is distributed over the height of the gas column and leads to a certain heat influx to the liquid in the cryotank.

A problem which arises in connection with superconducting applications is the heat influx to the cryogenic liquid which takes place because of the temperature difference between the surroundings and the object. This is due to the fact that good electric conductors are also good thermal conductors. In addition, at least at high currents, heat is developed in those parts of the current leads which are located in the gas-filled part of the cryotank due to the current which traverses the conductors. The electric heat generation takes place as a result of the ohmic resistance in the current leads. In case of alternating current, there is also the generation of heat because of the occurrence of eddy currents. The increased resistance arising because of the skin effect must also be taken into account.

Without quantifying the heat influx to the cryotanks and the internally developed heat in greater detail, it can be determined that to minimize the heat influx to the liquid, this heat has to be discharged in some way. Automatic means therefor is built into the relationship between the liquid and vapour phase of the refrigerant. If there is a tendency to increasing gas temperature, an increasing part of the liquid will change into gaseous state. The gas thus developed is allowed, via an opening on that part of the bushing which is located outside the cryotank, to flow freely out into the surrounding air.

The above means that a gas flow, which at the interface between liquid and gas largely maintains the temperature of the liquid, on its way up to the lid and the discharge into the surrounding air where it obtains the temperature of the surrounding air, flows around the current leads and hence can be used for cooling thereof. Since the direction of the gas flow is opposite to the heat influx, this gas cooling is often called counter-flow cooling. To make this cooling as efficient as possible, the current leads are designed as heat exchangers. As such, the current leads in the gas-filled part of the cryotank may have various designs. In Superconducting Magnets, Clarendon Press, Oxford 1983, page 272, the current leads are described as electrically parallel-connected foils which are mounted at a certain distance from each other for passage of a refrigerant along the foils. The package of foils is placed in a tubular surrounding casing of insulating material with an inner open space with a rectangularly formed cross section. From an article entitled "A review of current leads for cryogenic devices" in CRYOGENICS, April 1972, pages 193–200, it is clear that bar stock, tubes and thin wires twisted into a bundle can also be used as constructional elements for such current leads. In other embodiments, the aim is to obtain current leads with a large area/cross section ratio. When the current leads are shaped as tubes, holes can be made in the tubular wall both at the surface of the liquid and immediately below the lid. This allows the cooling gas also to flow internally in the tube and thus lead to improved cooling. However, there is a considerable risk involved in cooling with internal gas flow. If the gas flows in the two leads, temporarily or due to minor geometrical differences, become different, the current lead which has the smallest gas flow will be heated to a greater extent, thus increasing the viscosity and flow resistance of the flowing gas. This, in turn, leads to further deterioration of the gas flow which may eventually lead to superheating and destruction of the bushing. To prevent this, control devices must be introduced to maintain equal gas flows in the two leads.

To minimize the heat influx via the current leads, the cross section thereof is often dimensioned such that the current leads, at the connection to the lid of the cryotank, at rated current have the temperature gradient zero. No heat will then flow from the surroundings into the tank through the current leads.

SUMMARY OF THE INVENTION, ADVANTAGES

The invention comprises a cooling device which entails an efficient way of utilizing the gas flow which arises inside a cryotank for cooling the current leads, and this without the use of regulating devices. The device will be described, in principle, starting from a current feed-through for two mutually insulated current leads. Each one of the current leads consists of a number of plate-formed sub-leads. Inside the gas-filled part of the cryotank all the sub-leads are kept at a certain distance from each other, thus forming a space for the passage of the cooling gas. To ensure the same distance between the sub-leads and to achieve cooling channels in the space between the sub-leads, a number of rows of transverse ribs of insulating material, which are inclined and have the same pitch, are placed between the sub-leads. Viewing the current leads from the outside of the respective current lead and inwards towards the intermediate main insulation, the transverse ribs are inclined in the same direction, that is, either from the righthand side of the plates and upwards towards the lid, or vice versa. This also means that if it were possible to look "through" the two current leads, the transverse ribs would be inclined in opposite directions.

The two plate packages with intermediate insulation are then placed inside a casing with a substantially rectangular inner cross section. The casing is made of insulating material. Its inner dimensions are adapted such that an opposite wall pair has a width which corresponds to the width of the two plate packages including the intermediate insulation. The other opposite wall pair has a width which is somewhat greater than the width of the sub-lead. Fixed to the two inner walls of the casing facing the plate edges of the sub-leads are shelves with the same pitch as the pitch between the transverse ribs and with such a length and location that the shelves make contact with the plate edges at the ends of the transverse ribs.

A further function of the transverse ribs is to support the sub-leads such that the 100 Hz current forces to which the sub-leads are subjected are not allowed to initiate too large vibrations.

The length of the casing is adapted such that it is always smaller than the minimum height which the gas column may attain, and the casing is fixed such that the lower part always lies above the level of the cooling liquid.

The cooling device now operates in such a way that the gas which is developed in the cooling liquid and which penetrates through the surface of the cooling liquid is forced to pass through the lower layer of cooling channels on both sides of the main insulation positioned between the current leads. The gas flows of all of these channels then open out into the common interspace, located on either side, between the two lowermost shelves and are then forced to become distributed between all the cooling channels in the next row of cooling channels. In this way, two meander-shaped or spiral cooling coils, extending in parallel, will be created around the two current leads, which coils open out at the upper edge of the casing, whereupon the gas flowing through is allowed to flow out into the surrounding air via the above-mentioned opening.

No significant risk of local heating of any of the sub-leads exists since the cooling gas between the sub-leads in each cooling row is mixed in the interspace between two adjacent shelves.

An alternative embodiment of the device for cooling the sub-leads comprises providing only one meander-shaped or spiral cooling channel. Which of the proposed embodiments that in a given case should be chosen, and the dimensioning of the channels, the pitch etc. for optimal cooling, depends on a number of factors such as the shape of the cryotank, the refrigerant used, the height of the gas column, the rated current of the current leads, the number of current leads and the number of sub-leads, the material in the current leads, and so on.

The described embodiment of the cooling channels, starting from two current leads, can be used with the same fundamental solution also when the current feed-through comprises more than one current lead. This may, for example, be the case if the object whose electrical parts are to be in a superconducting state consists of windings of a reactor or a transformer.

The advantages of the described cooling device are that a possibility has been provided of minimizing the heat influx via the current leads, that a controlled flow of cooling gas is obtained without control devices, that the cooling channels are both simple to manufacture and to apply to the current leads, and that increased stability against vibrations is obtained.

BRIEF DESCRIPTION OF THE DRAWINGS

A cooling device according to the invention for the current leads in a gas-cooled bushing of a cryotank for superconducting applications and wherein the current leads consist of a number of plate-formed sub-leads will be clear from the accompanying figures, wherein FIG. 1 shows an example of the design of the cooling device where the bushing comprises two current leads, by means of a vertical section through a cryotank parallel to the width of the plate-formed sub-leads, FIG. 2 shows a vertical section through the cryotank perpendicular to the section according to FIG. 1 and extending through the centre of the current leads.

DESCRIPTION OF THE PREFERRED EMBODIMENTS

The embodiment of a cryotank is in general dependent on the shape and size of the object which is to obtain such a temperature that the electrical conductors associated with the object become superconducting. The bushings with their current leads, however, are practically always placed on the lid of the cryotank. However, the location on the lid where the bushings are to be placed can vary depending on the object considered.

Figure 3:
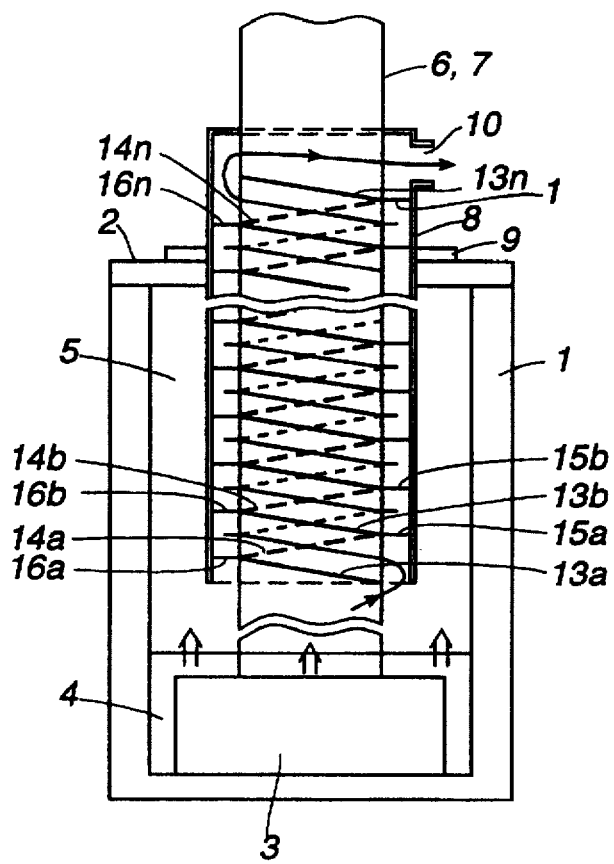
FIG. 3 shows an alternative embodiment of the cooling device by means of a section through a cryotank parallel to the width of the plate-formed sub-leads.

FIGS. 1, 2 and 3, which comprise embodiments with two current leads, show the cryotank 1, the lid 2, the object 3, the cryogenic liquid 4, the refrigerant in gaseous state 5, the current leads 6 and 7, the casing 8 of the bushing surrounding the current leads with the fixing flange 9, and the opening 10 for gas discharge.

FIG. 2 also shows the insulation 11 present between the current leads and that the current leads consist of a number of plate-formed sub-leads 12. Outside the cryotank these sub-leads are retained so as to form a more or less solid current lead. Both for reasons of cooling and other reasons, it is desirable to keep the sub-leads spaced a certain distance from each other inside the cryotank. To ensure the same distance between the sub-leads and to achieve cooling channels in the space between each sub-lead, as well as increased mechanical stability between the sub-leads, as is clear from FIGS. 1 and 3 a number of rows of transverse ribs 13a, 13b . . . 13n of insulating material, which are inclined and have the same pitch, are placed between the sub-leads of the current lead 6 and the corresponding inclined transverse ribs 14a, 14b . . . 14n of the current lead 7.

The two current leads with intermediate transverse ribs and insulation extend inside the casing 8 which has a substantially rectangular inner cross section. As is clear from FIG. 2, that sub-lead of the two current leads which lies furthest away from the intermediate insulation makes direct contact with one of the wall pairs in the casing. On the two walls of the casing facing the plate edges of the sub-leads, shelves 15a, 15b . . . 15n and 16a, 16b . . . 16n, respectively, are fixed and have the same pitch as the pitch between the transverse ribs and with such a length and location that the shelves make contact with the plate edges at the ends of the transverse ribs.

This leads to the creation of two spiral rows of cooling channels next to each other, which wind between and around the sub-leads. These channels will conduct the cooling gas from that part of the casing facing the cooling liquid around the sub-leads and up to the discharge at the opening 10.

FIG. 3 shows an alternative embodiment of the cooling device wherein only one row of cooling channels winds between and around the sub-leads.

Figure 4:
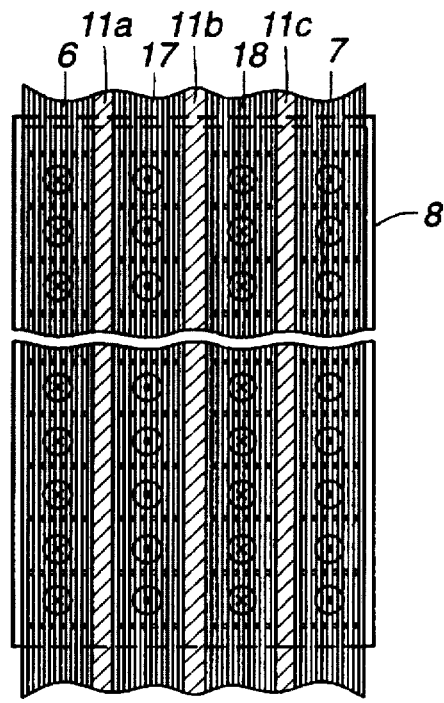
FIG. 4 shows an example of a cooling device in the same view as FIG. 2, wherein the bushing comprises four current leads.
Figure 5:
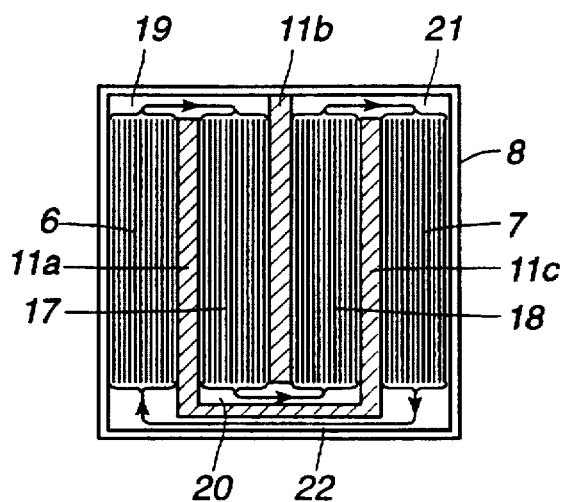
FIG. 5 shows a cross section through the current leads according to FIG. 4 in a horizontal plane.

Under the summary of the invention it was indicated that the principle of cooling of the current leads with rows of cooling channels which wind spirally around the current leads may be used also when the number of current leads is more than two. FIGS. 4 and 5 illustrate one of many possible embodiments with four current leads 6, 17, 18 and 7 with intermediate insulations 11a, 11b and 11c. FIG. 4 shows the current leads in the same view as FIG. 2, and FIG. 5 shows the current leads viewed from the side of the lid in some section of a row of cooling channels between two shelves which define a row of cooling channels. Also in this case, the package of current leads is surrounded by a casing 8 with a substantially rectangular cross section. The transition of the cooling gas flow between two adjacent current leads 6-17, 17-18 and 18-7 via the space between two shelves takes place in the same way as shown in FIG. 1 or 3 via the passages 19, 20 and 21. To close the circuit of cooling gas flow, that is, conduct the flow from the current lead 7 back to the current lead 6, the provision of a flow channel 22 for this purpose is required via the shelves. FIG. 4 shows an embodiment where the transition of the cooling gas flow from one row of cooling channels to the next takes place between the two outer current leads, that is, between the current leads 7 and 6, which at the same time means that the other transitions 19, 20 and 21 take place in the same row of cooling channels. A more purely spiral cooling gas path is obtained if the transition between each current lead is made with the same part pitch.

In FIGS. 1, 3 and 5 the paths of the cooling gas flow are indicated by arrows and in FIGS. 2 and 4 by a circle at the centre for outgoing flow and an encircled X for ingoing flow.

We claim:

1. A cooling device for cooling at least two current leads in a cryotank which contains a coolant partly as a liquid disposed in a lower part of the cryotank and partly as a gas which fills an upper part of the cryotank, whereby a liquid surface is formed at a boundary between the liquid and the gas, from which liquid surface, because of a heat influx to the cryotank, the gas flows upwardly towards an opening in a top part of the cryotank while at the same time the gas flows past the current leads arranged in the gas-filled upper part of the cryotank, which current leads feed current to an object located in the liquid, which object, in operation, is to be in a superconducting state, the current leads being mutually insulated by a layer of intermediate main insulation, each current lead comprising tape-formed sub-leads with two plane parallel sides and two edges and the tape-formed sub-leads of the current leads outside the cryotank being arranged in direct contact with each other at the parallel sides, the current leads being surrounded by a thin-walled tubular casing of insulating material having a substantially rectangular cross section and including two parallel wall pairs positioned perpendicular to each other, an upper end surface of the casing being located outside the cryotank, a lower end surface of the casing being located above the liquid surface, the casing thus constituting a bushing to the cryotank, said cooling device comprising an equal number of inclined transverse ribs having an equal pitch and spaced the same distance from each other and which are positioned between all sub-leads of the current leads inside the casing, a cross section of the surrounding casing being such that a first opposite wall pair has a width corresponding to the width of the current leads including the intermediate insulation, and including shelves on a second opposite wall pair at the same distance from each other as between the transverse ribs and wherein the shelves have such a length and location that the shelves make contact with plate edges at the ends of the transverse ribs, whereby, from a lower end surface of the casing, at least one spiral cooling coil is provided around the current leads which opens out at an upper end surface of the casing.

2. A cooling device for cooling of current leads in the bushings of a cryotank according to claim 1, wherein the pitch of the transverse ribs is such that a spiral cooling coil is formed around the current leads.

3. A cooling device for cooling of current leads in the bushings of a cryotank according to claim 1, wherein the pitch of the transverse ribs is such that two cooling coils, extending in parallel, are formed.

* * * * *